United States Patent Office 3,677,720
Patented July 18, 1972

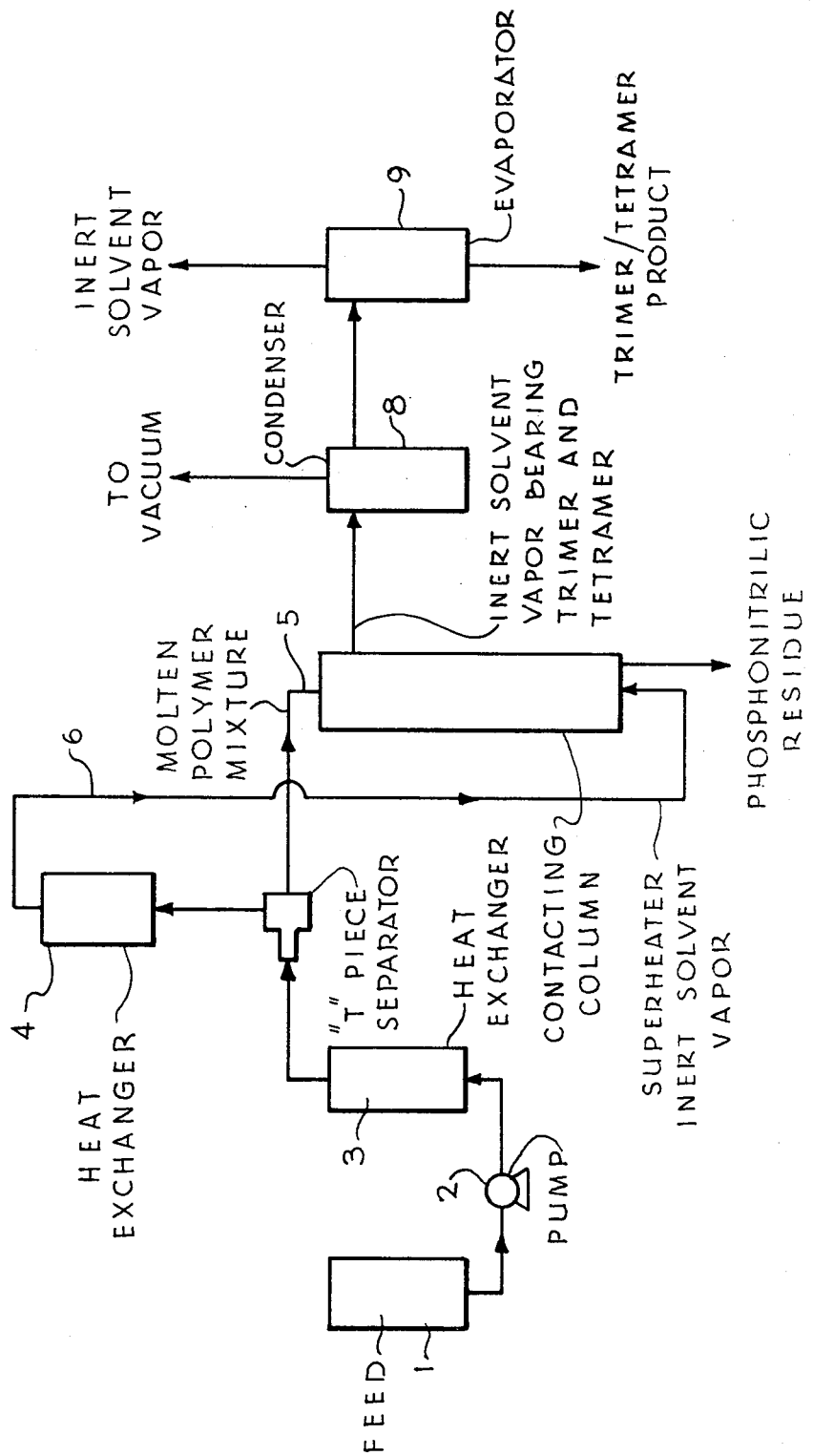

3,677,720
PURIFICATION OF PHOSPHONITRILIC
CHLORIDE POLYMERS
John Keith Maund, Birmingham, and Clifford Henry
George Hands, Stourbridge, England, assignors to
Hooker Chemical Corporation, Niagara Falls, N.Y.
Filed Mar. 14, 1969, Ser. No. 807,197
Int. Cl. C01b 21/00, 25/00
U.S. Cl. 23—357                                    16 Claims

ABSTRACT OF THE DISCLOSURE

A mixture of phosphonitrilic chloride polymers is purified by contacting a molten phosphonitrilic chloride mixture with an inert solvent vapor so as to selectively vaporize the cyclic trimeric polymer, separating a solvent vapor phase laden with trimer and some tetramer from the molten polymer residue, condensing it to form a solution of trimer and tetramer in the solvent, and subsequently recovering trimer together with some tetramer from the solution. During the process the molten phosphonitrilic chloride mixture is preferably maintained at a temperature below 140 degrees centigrade. The phosphonitrilic chloride polymer feed stock can be pretreated by dissolving it in an inert solvent, followed by heating the resulting solution under reflux in the presence of an absorbent medium, and subsequently cooling the solution and filtering it free from absorbent medium. The process provides a very efficient and economic method for the recovery and purification of phosphonitrilic chloride trimer.

This invention relates to improvements in the purification of phosphonitrilic chloride polymers.

Polymeric phosphonitrilic chloride material may be obtained as a mixture of polymers by the reaction of phosphorus pentachloride and ammonium chloride in an inert solvent with or without a catalyst of a metallic salt. The mixture obtained consists of (a) cyclic phosphonitrilic polymers $(PNCl_2)_n$, where $n$ is a positive integer of three or more and (b) linear $PNCl_2$ chains end-blocked with the elements of phosphorus pentachloride $(PNCl_2)_nPCl_5$. The cyclic polymers generally constitute the greater proportion of the product. The product of greatest utility is the cyclic trimer and it is therefore usually desired to separate this from the mixture. Since the trimer is the lowest-boiling polymer present, this separation may be accomplished by distillation.

However, distillation of phosphonitrilic chloride polymers is complicated by the fact that they tend to polymerise further at temperatures above their melting point. This process is catalysed by linear polymers and is also accelerated by increasing temperature, being rapid above 200° C. and appreciable above 140° C. The products of overpolymerisation are tarry intractable materials which are difficult to remove from equipment. Also yield is lost in this way. For these reasons it is desirable that polymer mixtures should be held in the liquid phase for as short a time as possible and at as low a temperature as possible. Many distillation procedures, however, have relatively lengthy hold up times in the still and may also require a heated holding tank to contain the molten feed for the distillation. Under these conditions it is not possible to prevent the overpolymerisation described. Another complicating factor is that condensing the vapour of the timer obtained from the distillation is difficult and requires relatively elaborate equipment.

These disadvantages were to some extent overcome by the process described in U.K. specification 1,016,642 and U.S. specification 3,372,005. This comprised a distillation technique in which the bulk of the cyclic trimer, together with some cyclic tetramer, was rapidly and selectively vaporised by the passage of a hot, inert gas such as nitrogen through the crude material. The inert gas, laden with trimer and tetramer vapour, was allowed to separate from the residue and was then contacted with an inert solvent to produce a solution of trimer and tetramer in that solvent. Evaporation of the solvent from the solution then gave a mixture consisting principally of trimer, together with some tetramer.

But this procedure involved the circulation and heating of considerable quantities of inert gas as well as a relatively complicated solvent contacting and circulation procedure for condensing the distillate in the manner described.

Another approach is described in U.S. specification 3,379,510. In this specification a mixture of phosphonitrilic chloride trimer, tetramer and higher polymers in the inert solvent, preferably monochlorobenzene, used in the formation reaction is treated with an absorbent medium to absorb linear polymers, filtered and passed into a falling film still. Here trimer, tetramer and solvent are removed as vapour and higher polymers are run off as tars from the base of the still. After condensation of the distillate and removal of solvent therefrom a mixture of trimer and tetramer, rich in the former, may be obtained.

However this process again is not wholly satisfactory because of the poor temperature control possible with falling film stills as well as the difficulties met with in their operation due to the accumulation of tarry deposits in the walls. Moreover in installing the falling-film still provision must be made against the highly corrosive nature of the phosphonitrilic chloride material. The normal means of surmounting this problem is to construct the apparatus of glass, which is not subject to such attack, but this course is not possible in the case of a falling film still.

We have now discovered a novel distillation technique for purification of phosphonitrilic chloride polymers which has considerable advantages over the previous methods described notably in that it provides a simple and easily controllable process which may be conducted in glass apparatus condenser.

Accordingly, the present invention provides a process for the selective purification of a mixture of phosphonitrilic chloride polymers which comprises contacting the molten phosphonitrilic chloride mixture with an inert solvent vapour in such a way as to selectively vaporise the cyclic trimeric polymer, separating the solvent vapour, laden with trimer and some tetramer, from the molten polymer residue, condensing it to form a solution of trimer and tetramer in the solvent, and subsequently recovering timer, together with some tetramer, from the solution.

In a preferred form of the invention the inert solvent is that which has been used as a reaction medium during the preparation reaction of the phosphonitrilic chloride polymers. The molten polymer mixture and the inert solvent vapour can then be obtained simultaneously by evaporation of the solvent from the reaction solution.

The starting materials for the process comprise an inert solvent and phosphonitrilic chloride polymers. In general the solvent may be any which dissolves, but does not react with, the phosphonitrilic chloride polymer mixture and which has a boiling point lower than that of the polymers.

Since it is desirable to maintain the temperature of the polymer mixture below about 140° C. in order to prevent overpolymerisation, we prefer to use solvents which will give a superheated vapour at this temperature without unduly low pressures being needed. Preferred solvents are those with boiling points in the range of 100–150° C. at atmospheric pressure, for example phosphorus oxychloride, tetrachloroethylene, monochlorobenzene, sym tetrachloroethane. Of these we prefer to use chlorinated hydrocarbons, and monochlorobenzene in particular as being the cheapest.

The crude phosphonitrilic chloride mixture normally contains a small amount of linear polymer which catalyses the further polymerisation of cyclic polymers. To eliminate this catalytic effect it is highly desirable to remove the linear polymer from the solution in the inert solvent before treatment by the process of the invention. This removal is conveniently effected by the procedure described in our specification No. 1,016,642. According to this the crude polymer mixture solution in the inert solvent is heated under reflux in the presence of an absorbent medium, such as bone char, fuller's earth, silica gel or bauxite. When the refluxing solution has become clear it is cooled and filtered free from the absorbent medium, preferably with the use of a filter aid. The absorbent medium absorbs the linear polymer and also serves to remove the other unwanted materials such as metal salts which were used as catalysts in the reaction stage. As an absorbent medium we prefer to use active carbon.

The process of the invention is illustrated, by way of example only, with reference to the accompanying drawing, which represents a schematic flow sheet. A crude solution 1, of phosphonitrilic chloride polymers in an inert solvent is charged by a pump 2, into a heat exchanger 3, where the inert solvent is vaporised. The liquid and vapour phases are then allowed to disengage and the solvent vapour is passed to a second heat exchanger 4, where it is superheated. The molten crude phosphonitrilic polymer mixture 5, and the superheated vapour 6, are then passed separately to a continuously operated contacting column 7 the superheated vapour stream 6, entering at the bottom and the molten polymer mixture 5 at the top. The temperature and pressure of the column 7 and the temperature of the solvent vapour are maintained so as to allow cyclic trimeric and tetrameric phosphonitrilic chlorides to be selectively vapourised and to be carried out at the top of the column 7 with the inert solvent vapour. As residue of high-boiling polymeric material is continuously discharged from the bottom of the column 7, the material leaving the top of the column 7, and consisting of inert solvent vapour, bearing trimeric and tetrameric polymer, is condensed in a condenser 8 to give a solution of trimer and tetramer in inert solvent which is then passed to an evaporator 9. In the evaporator the solvent is removed to be condensed and re-used at the reaction stage. The other product leaving the evaporator 11 is substantially pure trimer and tetramer.

A preliminary stage to the process of the invention is to obtain inert solvent vapour and a molten solution of polymers. This may be done by conventional means. In order to discourage over-polymerisation, the temperature to which the polymers are exposed should be kept as low as possible, preferably below 140° C., but at the same time above the melting point of the mixture which will vary within the range 90–120° C. according to the composition.

Where the inert solvent vapour and polymer solution are obtained simultaneously by evaporation of the solvent from the reaction mixture through a heat exchanger, preferably at a temperature below 140° C., reduced pressure may be used to ensure that the solvent boils at this temperature. The solvent vapour and liquid polymer phases so produced may be allowed to disengage prior to re-contacting according to the process of the invention.

In a preferred form of the invention the solvent vapour is superheated above its condensation point before contacting with the polymer mixture. Superheating may be carried out by conventional means; e.g. by passing the solvent vapour, through a heat exchanger. Reduced pressure may be needed in order to maintain a superheated vapour in the preferred temperature range, which is 110–130° C.

The means of contacting the inert solvent vapour with the phosphonitrilic chloride polymer mixture typically consists of a lagged or heated vertical column with a vapour inlet at the bottom and a vapour outlet at the top. Provision is also made for introducing the molten polymer mixture at the top of the column and for removing the stripped residue at the bottom. The column is either packed or contains a series of trays or baffles in order to achieve the maximum contact between the vapour and the liquid. However, any other arrangement for contacting the vapour and liquid phases and removing the contacted streams will suffice.

Preferably the solvent vapour is superheated above its boiling point so as to supply the heat required for vaporising the trimer and tetramer more rapidly and directly. The operating temperature for the contacting stage should be chosen with regard to the yield and purity of product required. Higher temperatures favour an increased proportion of tetramer in the distilled product but a higher overall yield of trimer and tetramer. Lower temperatures favour an increased proportion of trimer in the product but a lower overall yield. Too high a temperature will also encourage overpolymerisation as stated, whilst too low a temperature may allow the polymer to solidify.

The preferred operating temperatures are in the range of 110–130° C. at approximately 50 mm. pressure. Higher quality of product is also favoured by driping the temperature of the vapour over the column as low as possible, with the limitation that the polymers must remain in the vapour phase. We have found that a temperature of substantially 90° C. at substantially 50 mm. pressure is suitable at this stage.

The pressure used in the contacting stage may be varied to give a solvent vapour which is suitable for use according to the factors described. Also it is desirable that the pressure chosen should be sufficiently high to give a contacted vapour which may be readily condensed at the next stage of the process. We prefer to use pressures in the range 40–60 mm.

The ratio of solvent vapour to polymer feed may be chosen according to process economics. Lower vapour to polymer ratios will reduce heat usage but will also lead to reducing the rate of polymer vaporisation at a given pressure. Where the solvent vapour and polymer solution are obtained simultaneously from the reaction solution, the process may be made more flexible if provision is made for tapping off a side stream of solvent vapour prior to the recontacting stage. This side-stream may be condensed and returned to the reaction process, the rate of removal in this way being adjusted as desired. Preferably the solvent vapour is present in sufficient quantity to dissolve the volatilise phosphonitrilic compounds on condensation. We prefer to use a solvent to polymer ratio of between 3.3 and 4.3 moles of solvent per mole of hypothetical $PNCl_2$ in the feed.

By suitable choice of operating conditions, with regard to the factors described, it is possible to ensure that the inert solvent vapour vaporises the greater proportion of cyclic trimer in the crude feed together with only a small percentage of tetramer.

The vapours emerging from the contacting column laden with cyclic trimeric and tetrameric polymer are treated in a conventional manner to recover the solid polymers free from solvent. Typically as in the example they are condensed in a condenser to a solution of polymer in inert solvent. The solvent may then be removed from this solution by evaporation to leave a mixture of solid trimer containing some tetramer. The evaporated solvent may be condensed and re-used for the reaction stage. Alternatively, the solution obtained by condensing the contacted vapour may be concentrated and substantially pure trimer allowed to crystallise out.

The process of the invention is illustrated by the examples given below. Percentages are expressed on a weight basis throughout.

EXAMPLE 1

A solution of composition 78/20/2 (percent monochlorobenzene/trimer/tetramer) was fed by a metering pump through the coil of a heat exchanger held at 50 mm. pressure and heated by hot oil at a temperature of 160° C. From there the material passed to a T piece separating tube where the monochlorobenzene separated off as a vapour leaving molten polymer mixture. The vapour was fed through the coil of a second heat exchanger. Both streams were then passed to a six ft. long three inch diameter vertical column packed with ¼" ceramic saddles. The molten polymer entered the top of the collum at 117° C. and the monochlorobenzene vapour passed countercurrently from the bottom of the column, entering at 100° C. The pressure at the top of the column was 50 mm. absolute.

The vapour led off from the top of the column had a composition of (percent monochlorobenzene/trimer/tetramer), 82/17/1. The residue tapped off from the bottom of the column consisted of trimer and tetramer in the ratio 76/24. The fractions of the initial feeds of trimer and tetramer which were obtained as distillate were therefore 74% and 42% respectively.

The distillate was condensed in a condenser and then flash evaporated to recover solid product consisting of 94% trimer and 6% tetramer.

EXAMPLE 2

A solution of composition 77/14/7/2 (percent monochlorobenzene/trimer/tetramer/higher cyclics) was subjected to a similar treatment to that of Example 1. The pressure at the top of the contacting column was held at 50 mm. whilst that at the base of the column and in the evaporation stage was at 80 mm. The liquid phosphonitrilic feed entered the column at 133° C. and the monochlorobenzene vapour at 132° C. The temperature of the vapour over the column was 93° C.

A product consisting of 85% trimer and 15% tetramer was obtained, the percentages of total trimer and tetramer vaporised from the initial feed being 88.5 and 32 respectively.

We claim:
1. A process for the selective purification of a mixture of phosphonitrilic chloride polymers which comprises:
   (1) countercurrently contacting a molten phosphonitrilic chloride polymer mixture with a superheated inert solvent vapor so as to selectively vaporize the cyclic trimer polymer, the heat required for vaporizing said cyclic trimer polymer being supplied by said superheated solvent vapor,
   (2) separating a solvent vapor phase laden with trimer and some tetramer from a molten polymer residue,
   (3) condensing the resulting solvent vapor phase to form a solution of trimer and tetramer in the solvent, and subsequently
   (4) recovering trimer together with some tetramer from the solution.
2. A process according to claim 1 wherein the inert solvent is the same compound as that which was used as a reaction medium in the preparation reaction of the phosphonitrilic chloride polymers.
3. A process according to claim 1 wherein the inert solvent is a chlorinated hydrocarbon boiling in the range 100–150° C. at atmospheric pressure.
4. A process according to claim 3 wherein the inert solvent is monochlorobenzene.
5. A process according to claim 1 wherein the molten phosphonitrilic chloride mixture is maintained at a temperature below 140° C.
6. A process according to claim 1 wherein the mixture of phosphonitrilic chloride polymers has previously been dissolved in an inert solvent, heated under reflux in the presence of an absorbent medium, and subsequently cooled and filtered free from absorbent medium.
7. A process according to claim 6 where the absorbent medium is active carbon.
8. A process according to claim 1 wherein the inert solvent vapor is superheated above its condensation point before contacting with the mother phosphonitrilic chloride mixture.
9. A process according to claim 8 wherein the inert solvent vapor is superheated to between 110 and 130° C.
10. A process according to claim 1 wherein the contacting step is performed countercurrently in a contacting zone packed with trays or baffles.
11. A process according to claim 10 wherein the contacting is carried out at a temperature of between 110 and 130° C. and a pressure of between 40 and 60 mms.
12. A process according to claim 11 wherein the temperature of the vapor over the column is substantially 90° C. and the pressure thereof is substantially 50 mms.
13. A process according to claim 1 wherein the ratio of inert solvent to polymer is about 3.3 to about 4.3 moles of solvent per mole of hypothetical material of the formula $PNCl_2$ in the feed.
14. A process according to claim 1 wherein the recovery of trimer together with some tetramer is carried out by evaporation of the solvent from the phosphonitrilic chloride product.
15. A process according to claim 1 wherein the final recovery of trimer together with some tetramer is carried out by concentrating the solution and allowing substantially pure trimer to crystallize out.
16. A process for the selective purification of a mixture of phosphonitrilic polymers comprising:
   (1) heating said mixture of polymers in an inert solvent which previously has been used as a reaction medium during the preparation of said polymers, so as to render said polymers molten and vaporize said solvent,
   (2) separating said vaporized inert solvent from said molten polymer mixture,
   (3) superheating said solvent vapor to a temperature in the range of 110 to 130 degrees centigrade,
   (4) countercurrently contacting the superheated inert solvent vapor with said molten polymer mixture in a contacting zone wherein cyclic trimeric and tetrameric phosphonitrilic chlorides are selectively vaporized, the heat required for vaporizing said cyclic trimeric and tetrameric phosphonitrilic chlorides being supplied by said superheated solvent vapor,
   (5) separating a resulting vapor phase consisting of said solvent vapor laden with vapors of phosphonitrilic chloride trimer and a minor proportion of phosphonitrilic chloride tetramer from said molten polymer mixture to leave a molten polymer residue,
   (6) condensing said resulting vapor phase to form a solution of said trimeric and tetrameric phosphonitrilic chlorides in said solvent and
   (7) evaporating said solvent from the desired solid trimeric and tetrameric phosphonitrilic chloride product.

References Cited

UNITED STATES PATENTS

| | | | |
|---|---|---|---|
| 2,731,081 | 1/1956 | Mayner | 203—49 X |
| 3,274,245 | 9/1966 | Bobsein et al. | 203—49 X |
| 3,372,005 | 3/1968 | Jaszka et al. | 23—357 |
| 3,379,510 | 4/1968 | Jaszka | 23—357 |

MILTON WEISSMAN, Primary Examiner

U.S. Cl. X.R.

203—41, 50, 67